(No Model.)
A. V. MESEROLE.
SECONDARY BATTERY ELECTRODE.
No. 399,274. Patented Mar. 12, 1889.
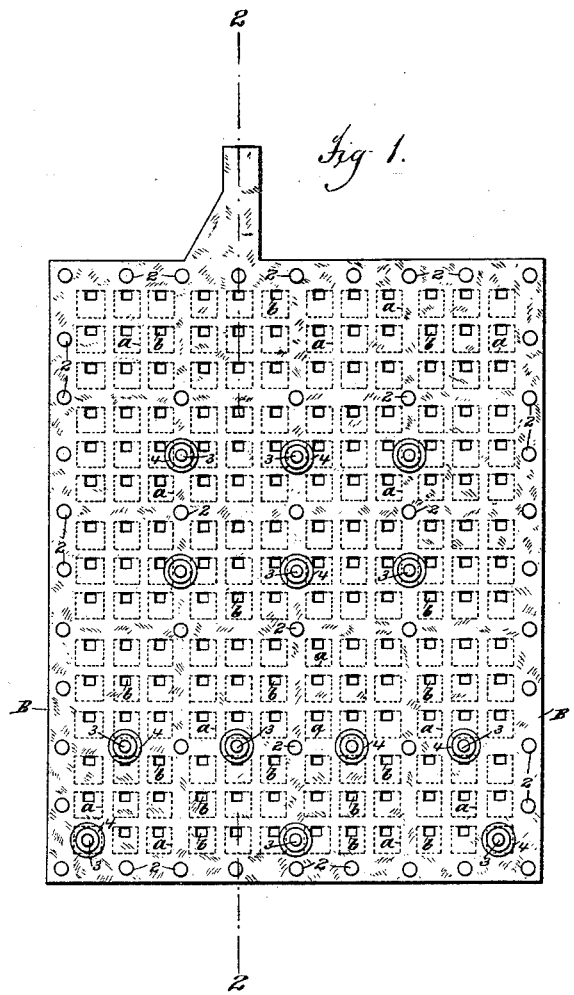

UNITED STATES PATENT OFFICE.

ABRAHAM V. MESEROLE, OF NEW YORK, N. Y.

SECONDARY=BATTERY ELECTRODE.

SPECIFICATION forming part of Letters Patent No. 399,274, dated March 12, 1889.

Application filed December 26, 1888. Serial No. 294,644. (No model.)

*To all whom it may concern:*

Be it known that I, ABRAHAM V. MESEROLE, a citizen of the United States, residing at New York, county of New York, and State of New York, have invented certain new and useful Improvements in Battery-Electrodes, fully described and represented in the following specification and the accompanying drawings, forming a part of the same.

This invention relates to the construction of electrodes available for both primary and secondary batteries, the invention, as herein shown and described, being, however, more particularly adapted for use in secondary or storage batteries.

It has been found advantageous in both classes of battery to construct the electrodes in a form that will provide a large surface for contact with the contained absorbent or depolarizing material and at the same time retain the material securely and allow the fluid or electrolyte free access to and circulation about the electrode and the active or depolarizing material contained in it.

It is desirable to have the electrodes so constructed that the electric current, in passing through, into, or out of the electrode, will be so distributed and conducted as to act upon every part of the contained material. This is accomplished in a novel manner by the present invention by having a large surface of contact between the absorbent or depolarizer and the conducting-body of the electrode and by admitting of free access and circulation of the electrolyte above the deposited material contained within the electrode.

The object of the present invention is also to accomplish these results in a simple and convenient manner, thereby producing an efficient and durable battery both mechanically and electrically.

A full understanding of the present invention can be best given by an illustration and a detailed description of an electrode embodying the same. All further preliminary description will therefore be omitted and a full description given, reference being had to the accompanying drawings, in which—

Figure 1 is a side view of an electrode constructed according to the present invention. Fig. 2 is a vertical section of the same, taken on the line 2 of Fig. 1. Fig. 3 is a similar view illustrating a change in the construction which will be referred to. Fig. 4 is a similar view showing another change which may be made.

Referring to said figures, it is to be understood that the electrode therein illustrated is of composite form, it being composed of a plurality of parts which are in the completed article so secured together as to provide perfect mechanical and electrical union.

The main part of the electrode consists of a plate, A, which, if the electrode is to be used in a secondary battery, is composed of lead or an alloy of lead or other similar suitable material. This plate is provided with a number of openings which extend through from side to side. The openings in the plate A are so arranged that the majority of the openings are separated by only comparatively thin walls, thus giving a great amount of exposed surface with a comparatively small amount of metal. At intervals, however, the walls between the openings are made comparatively thick, as shown, so as to give the requisite stiffness to the plate. Located upon opposite sides of the plate A are thin plates B, composed of a non-corroding alloy of lead, and provided with small openings b, which open into the chambers or cavities a, formed by the openings of the plate A. The openings b are so located as to communicate with the upper portions of the chambers a and afford direct communication through the electrode at those points. For the purpose of securing the plates B to the plate A, the latter is provided in its manufacture with a suitable number of studs, 2, which project from its opposite faces and pass through openings formed in the plates B, and after the plates B have been placed in position these studs are melted and burned down so as to form a homogeneous union between the plates, thus making a perfect mechanical and electrical connection. By this construction free circulation is afforded through the openings b and chambers a from one side to the other of the electrode at a large number of points, thus providing for perfect circulation in the battery, and the interiors of the chambers a being exposed to the fluid of the battery provides an exceedingly large surface for the passages of the current from the electrode to the fluid, and vice versa, and at the same time the construction which has been described provides an exceedingly rigid, simple, and inexpensive electrode.

In the case of secondary batteries the chambers $a$ may be filled below the openings $b$ with oxide of lead or other active material, where such material is required. In the case of primary batteries the plates A B will of course be composed of suitable material for such batteries, and the chambers $a$ may in such case contain a suitable depolarizer.

In the case of secondary batteries the electrodes thus constructed may be provided with fenders 3, by which the several electrodes will be prevented from coming into electrical contact with each other. These fenders consist of rods of glass or other non-conducting material, which pass through the electrode and are held in position by nuts and washers 4. In the case of primary batteries the fenders 3 and nuts and washers 4 will in some cases be all that is required to properly join the plates A B.

The construction which has been described is the preferred one; but in some cases one of the plates B may be made integral with the plate A, as indicated in Fig. 3, and such construction is in a broad sense to be considered as the equivalent of that first described. Where the plates B are referred to as located upon opposite sides of the plate A, it is to be understood that such expression is intended to include said plates, whether made integral with or separate from the plate A; also it will in some cases be preferable to surround the openings $b$ with inwardly-projecting flanges 5, as indicated in Fig. 4, which will serve to prevent the active material or the depolarizing material contained in the chambers $a$ from being so readily washed out of the chambers or otherwise displaced.

What I claim is—

1. The herein-described composite electrode, consisting of a plate, A, perforated to provide chambers $a$, and plates B, located upon the opposite sides of said plate A, and having openings $b$, communicating with the chambers $a$ and of less size than said chambers, substantially as described.

2. The herein-described electrode, consisting of the plate A, perforated to provide chambers $a$ and having studs 2, and the plate or plates B, secured to said plate A by said studs 2 and having openings $b$, which communicate with the chambers $a$, but are of less size than said chambers, substantially as described.

3. The herein-described composite electrode, consisting of a plate, A, perforated to provide chambers $a$, and plates B, located upon the opposite sides of said plates A, and having openings $b$, communicating with the chambers $a$, surrounded by inwardly-projecting flanges 5 and of less size than said chambers, substantially as described.

4. The herein-described composite electrode, consisting of a plate, A, perforated to provide chambers $a$, which are separated by walls of different thicknesses in different parts of the plate, and plates B, located upon the opposite sides of said plate A, and having openings $b$, communicating with the chambers $a$ and of less size than said chambers, substantially as described.

In testimony whereof I have hereunto set my hand in the presence of two subscribing witnesses.

ABRAHAM V. MESEROLE.

Witnesses:
T. H. PALMER,
G. M. BORST.